United States Patent [19]

Sallas

[11] Patent Number: 4,723,231

[45] Date of Patent: Feb. 2, 1988

[54] SOURCE TUNABLE ARRAY FOR GROUND ROLL REDUCTION

[75] Inventor: John J. Sallas, Plano, Tex.

[73] Assignee: Texas Instruments Incorporated, Dallas, Tex.

[21] Appl. No.: 4,744

[22] Filed: Jan. 7, 1987

Related U.S. Application Data

[63] Continuation of Ser. No. 707,919, Mar. 4, 1985, abandoned.

[51] Int. Cl.⁴ .......................... G01V 1/24; G01V 1/36
[52] U.S. Cl. ................................. 367/189; 367/190; 367/56; 181/108; 181/111; 364/421; 73/662
[58] Field of Search .................. 73/662; 181/108, 109, 181/110, 111, 112, 113, 114; 367/20, 24, 47, 48, 49, 55, 56, 58, 72, 106, 177, 189, 190; 364/421

[56] References Cited

U.S. PATENT DOCUMENTS

| | | | |
|---|---|---|---|
| 2,642,146 | 6/1953 | Woods | 181/111 |
| 2,657,373 | 10/1953 | Piety | 367/58 |
| 3,550,073 | 12/1970 | Foster et al. | 367/24 |
| 3,698,508 | 10/1972 | Landrum, Jr. | 367/190 |
| 3,761,874 | 9/1973 | Landrum | 367/190 |
| 3,984,805 | 10/1976 | Silverman | 367/190 |
| 4,014,403 | 3/1977 | Mifsud | 367/190 X |
| 4,312,050 | 1/1982 | Lucas | 367/43 |
| 4,458,341 | 7/1984 | Goebel | 367/43 |
| 4,512,001 | 4/1985 | Mayne et al. | 181/113 |
| 4,564,927 | 1/1986 | Kolb | 367/190 X |

FOREIGN PATENT DOCUMENTS 2043896 10/1980 United Kingdom ................ 367/190

OTHER PUBLICATIONS

The Seismograph Service Companies, Non-Linear Vibrator Sweeps Development Report: SSC-1011, Geophysics, 12/85, p. 4.

Capon, Jack, *Analysis of Rayleigh-Wave Multipath Propagation,* Bulletin Seismologic Soc., vol. 60 #5, pp. 1701-1731.

*Primary Examiner*—Deborah L. Kyle
*Assistant Examiner*—Brian S. Steinberger
*Attorney, Agent, or Firm*—Thomas G. Devine; James T. Comfort; Melvin Sharp

[57] ABSTRACT

A method of reducing Rayleigh waves (ground roll) in land seismic exploration employs a unique combination of amplitude output from and spacing of the vibrator sources making up a land seismic exploration system. The velocity of the Rayleigh wave for the prospect to be explored is determined. At least one receiver is used and is spaced from the vibrator sources a distance sufficient to establish the receiver as being in the far-field. The output of each of the vibrator sources is locked in phase and frequency and known separations between the vibrator sources are maintained. The frequency is varied and the individual output amplitude of each vibrator source is varied at each frequency so that the resultant Rayleigh waves traverse the known separations resulting in out-of-phase Rayleigh waves between the sources. The proper selection of output amplitude and separation provides for reduction in the Rayleigh wave that is ultimately transmitted to the receiver by essentially adjusting the out-of-phase results to minimize the Rayleigh waves transmitted to the receiver. The source outputs must be of an amplitude high enough to provide sufficient downward energy for exploration.

14 Claims, 13 Drawing Figures

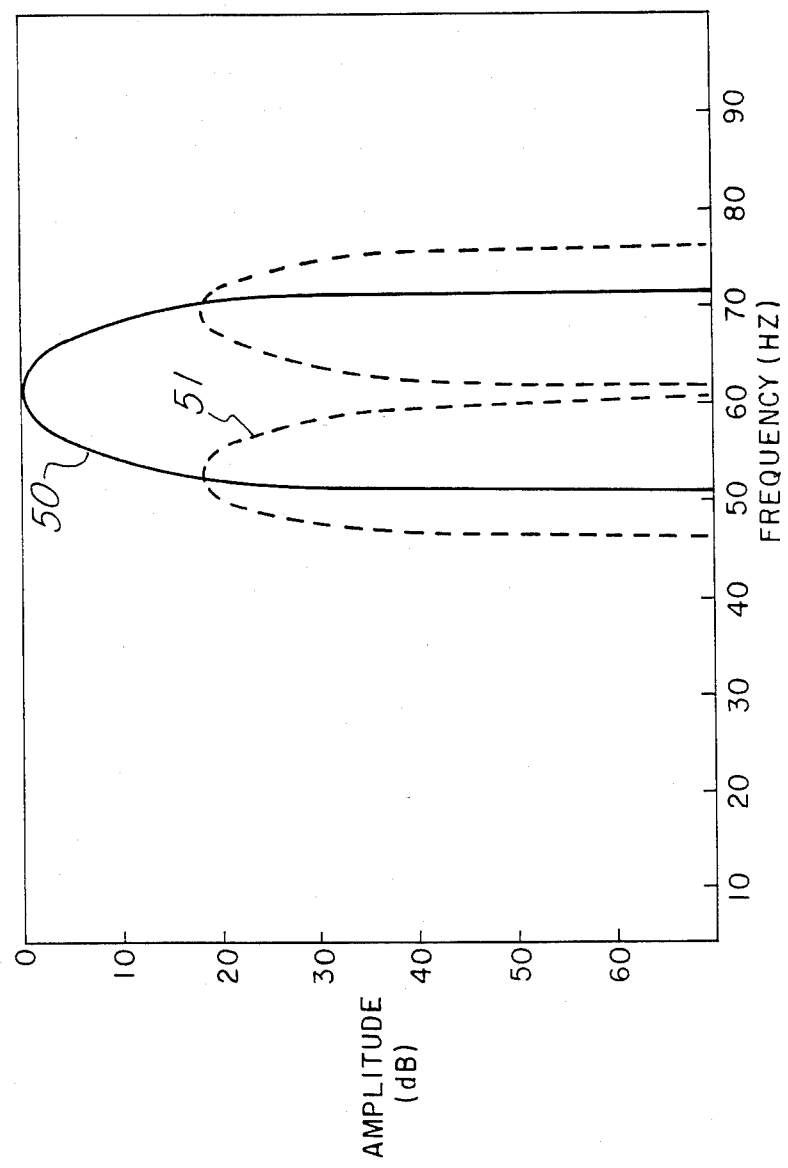

|  | AMPLITUDE | | |
| FREQUENCY | "A" | "B" | FARFIELD (dB) |
| --- | --- | --- | --- |
| 10.00 | .779 | .221 | -100.0000 |
| 10.50 | .779 | .221 | -100.0000 |
| 11.00 | .779 | .221 | -100.0000 |
| 11.50 | .779 | .221 | -100.0000 |
| 12.00 | .724 | .276 | -100.0000 |
| 12.50 | .675 | .325 | -100.0000 |
| 13.00 | .631 | .369 | -97.1075 |
| 13.50 | .593 | .407 | -100.0000 |
| 14.00 | .558 | .442 | -100.0000 |
| 14.50 | .528 | .472 | -95.1602 |
| 15.00 | .500 | .500 | -100.0000 |
| 15.50 | .475 | .525 | -100.0000 |
| 16.00 | .453 | .547 | -100.0000 |
| 16.50 | .432 | .568 | -77.9249 |
| 17.00 | .414 | .586 | -100.0000 |
| 17.50 | .397 | .603 | -87.6921 |
| 18.00 | .382 | .618 | -100.0000 |
| 18.50 | .368 | .632 | -70.5280 |
| 19.00 | .355 | .645 | -100.0000 |
| 19.50 | .344 | .656 | -100.0000 |
| 20.00 | .333 | .667 | -100.0000 |
| 20.50 | .324 | .676 | -72.2036 |
| 21.00 | .315 | .685 | -72.6235 |
| 21.50 | .307 | .693 | -75.5312 |
| 22.00 | .300 | .700 | -73.5614 |
| 22.50 | .293 | .707 | -100.0000 |
| 23.00 | .287 | .713 | -100.0000 |
| 23.50 | .281 | .719 | -100.0000 |
| 24.00 | .276 | .724 | -95.9709 |
| 24.50 | .272 | .728 | -73.6298 |
| 25.00 | .268 | .732 | -100.0000 |
| 25.50 | .264 | .736 | -100.0000 |
| 26.00 | .261 | .739 | -82.9548 |
| 26.50 | .259 | .741 | -86.9077 |
| 27.00 | .257 | .743 | -83.7514 |
| 27.50 | .254 | .746 | -100.0000 |
| 28.00 | .253 | .747 | -100.0000 |
| 28.50 | .251 | .749 | -100.0000 |
| 29.00 | .251 | .749 | -100.0000 |
| 29.50 | .250 | .750 | -100.0000 |
| 30.00 | .250 | .750 | -100.0000 |
| 30.50 | .250 | .750 | -100.0000 |
| 31.00 | .251 | .749 | -100.0000 |
| 31.50 | .251 | .749 | -100.0000 |
| 32.00 | .253 | .747 | -100.0000 |
| 32.50 | .254 | .746 | -100.0000 |
| 33.00 | .257 | .743 | -83.7457 |
| 33.50 | .259 | .741 | -86.8882 |
| 34.00 | .261 | .739 | -82.9356 |
| 34.50 | .264 | .736 | -100.0000 |
| 35.00 | .268 | .732 | -100.0000 |
| 35.50 | .272 | .728 | -73.6161 |
| 36.00 | .276 | .724 | -95.7130 |
| 36.50 | .281 | .719 | -100.0000 |
| 37.00 | .287 | .713 | -100.0000 |
| 37.50 | .293 | .707 | -100.0000 |
| 38.00 | .300 | .700 | -73.5252 |
| 38.50 | .307 | .693 | -75.4772 |
| 39.00 | .315 | .685 | -72.5847 |
| 39.50 | .324 | .676 | -72.1578 |

*Fig. 6a*

| | | | |
|---|---|---|---|
| 40.00 | .333 | .667 | -100.0000 |
| 40.50 | .344 | .656 | -100.0000 |
| 41.00 | .355 | .645 | -100.0000 |
| 41.50 | .368 | .632 | -100.0000 |
| 42.00 | .382 | .618 | -100.0000 |
| 42.50 | .397 | .603 | -87.2456 |
| 43.00 | .414 | .586 | -100.0000 |
| 43.50 | .432 | .568 | -77.7701 |
| 44.00 | .453 | .547 | -100.0000 |
| 44.50 | .475 | .525 | -100.0000 |
| 45.00 | .500 | .500 | -100.0000 |
| 45.50 | .500 | .500 | -100.0000 |
| 46.00 | .500 | .500 | -100.0000 |
| 46.50 | .500 | .500 | -100.0000 |
| 47.00 | .500 | .500 | -100.0000 |
| 47.50 | .500 | .500 | -100.0000 |
| 48.00 | .500 | .500 | -100.0000 |
| 48.50 | .500 | .500 | -100.0000 |
| 49.00 | .500 | .500 | -100.0000 |
| 49.50 | .500 | .500 | -100.0000 |
| 50.00 | .500 | .500 | -100.0000 |
| 50.50 | .500 | .500 | -28.5077 |
| 51.00 | .500 | .500 | -21.7318 |
| 51.50 | .500 | .500 | -17.5494 |
| 52.00 | .500 | .500 | -14.4758 |
| 52.50 | .500 | .500 | -12.0414 |
| 53.00 | .500 | .500 | -10.0347 |
| 53.50 | .500 | .500 | -8.3415 |
| 54.00 | .500 | .500 | -6.8925 |
| 54.50 | .500 | .500 | -5.6426 |
| 55.00 | .500 | .500 | -4.5609 |
| 55.50 | .500 | .500 | -3.6249 |
| 56.00 | .500 | .500 | -2.8182 |
| 56.50 | .500 | .500 | -2.1284 |
| 57.00 | .500 | .500 | -1.5459 |
| 57.50 | .500 | .500 | -1.0635 |
| 58.00 | .500 | .500 | -.6755 |
| 58.50 | .500 | .500 | -.3778 |
| 59.00 | .500 | .500 | -.1672 |
| 59.50 | .500 | .500 | -.0417 |
| 60.00 | .500 | .500 | .0000 |
| 60.50 | .500 | .500 | -.0417 |
| 61.00 | .500 | .500 | -.1672 |
| 61.50 | .500 | .500 | -.3778 |
| 62.00 | .500 | .500 | -.6755 |
| 62.50 | .500 | .500 | -1.0634 |
| 63.00 | .500 | .500 | -1.5458 |
| 63.50 | .500 | .500 | -2.1283 |
| 64.00 | .500 | .500 | -2.8181 |
| 64.50 | .500 | .500 | -3.6248 |
| 65.00 | .500 | .500 | -4.5607 |
| 65.50 | .500 | .500 | -5.6424 |
| 66.00 | .500 | .500 | -6.8922 |
| 66.50 | .500 | .500 | -8.3412 |
| 67.00 | .500 | .500 | -10.0344 |
| 67.50 | .500 | .500 | -12.0410 |
| 68.00 | .500 | .500 | -14.4752 |
| 68.50 | .500 | .500 | -17.5487 |
| 69.00 | .500 | .500 | -21.7308 |
| 69.50 | .500 | .500 | -28.5059 |

*Fig. 6b*

| | | | |
|---|---|---|---|
| 70.00 | .500 | .500 | -100.0000 |
| 70.50 | .500 | .500 | -100.0000 |
| 71.00 | .500 | .500 | -100.0000 |
| 71.50 | .500 | .500 | -100.0000 |
| 72.00 | .500 | .500 | -100.0000 |
| 72.50 | .500 | .500 | -100.0000 |
| 73.00 | .500 | .500 | -100.0000 |
| 73.50 | .500 | .500 | -100.0000 |
| 74.00 | .500 | .500 | -100.0000 |
| 74.50 | .500 | .500 | -100.0000 |
| 75.00 | .500 | .500 | -100.0000 |
| 75.50 | .475 | .525 | -100.0000 |
| 76.00 | .453 | .547 | -100.0000 |
| 76.50 | .432 | .568 | -78.0853 |
| 77.00 | .414 | .586 | -100.0000 |
| 77.50 | .397 | .603 | -88.1385 |
| 78.00 | .382 | .618 | -100.0000 |
| 78.50 | .368 | .632 | -70.5847 |
| 79.00 | .355 | .645 | -100.0000 |
| 79.50 | .344 | .656 | -100.0000 |
| 80.00 | .333 | .667 | -100.0000 |
| 80.50 | .324 | .676 | -72.2503 |
| 81.00 | .315 | .685 | -72.6710 |
| 81.50 | .307 | .693 | -75.5961 |
| 82.00 | .300 | .700 | -73.5963 |
| 82.50 | .293 | .707 | -100.0000 |
| 83.00 | .287 | .713 | -100.0000 |
| 83.50 | .282 | .718 | -71.6410 |
| 84.00 | .276 | .724 | -96.1075 |
| 84.50 | .272 | .728 | -73.6427 |
| 85.00 | .268 | .732 | -100.0000 |
| 85.50 | .264 | .736 | -100.0000 |
| 86.00 | .261 | .739 | -82.9575 |
| 86.50 | .259 | .741 | -86.9617 |
| 87.00 | .257 | .743 | -83.7962 |
| 87.50 | .254 | .746 | -100.0000 |
| 88.00 | .253 | .747 | -100.0000 |
| 88.50 | .251 | .749 | -100.0000 |
| 89.00 | .251 | .749 | -100.0000 |
| 89.50 | .250 | .750 | -100.0000 |
| 90.00 | .250 | .750 | -100.0000 |
| 90.50 | .250 | .750 | -100.0000 |
| 91.00 | .251 | .749 | -100.0000 |
| 91.50 | .251 | .749 | -100.0000 |
| 92.00 | .253 | .747 | -100.0000 |
| 92.50 | .254 | .746 | -100.0000 |
| 93.00 | .257 | .743 | -83.7721 |
| 93.50 | .259 | .741 | -86.9064 |
| 94.00 | .261 | .739 | -82.9111 |
| 94.50 | .264 | .736 | -100.0000 |
| 95.00 | .268 | .732 | -100.0000 |
| 95.50 | .272 | .728 | -73.6023 |
| 96.00 | .276 | .724 | -95.4464 |
| 96.50 | .281 | .719 | -100.0000 |
| 97.00 | .287 | .713 | -100.0000 |
| 97.50 | .293 | .707 | -100.0000 |
| 98.00 | .300 | .700 | -73.4886 |
| 98.50 | .307 | .693 | -75.4387 |
| 99.00 | .315 | .685 | -72.5420 |

*Fig. 6c*

| FREQ. (Hz) | AMPLITUDE "A" | "B" | FARFIELD RESPONSE (dB) |
|---|---|---|---|
| 10.00 | .779 | .221 | -100.0000 |
| 10.50 | .779 | .221 | -100.0000 |
| 11.00 | .779 | .221 | -100.0000 |
| 11.50 | .779 | .221 | -100.0000 |
| 12.00 | .724 | .276 | -100.0000 |
| 12.50 | .675 | .325 | -100.0000 |
| 13.00 | .631 | .369 | -93.5573 |
| 13.50 | .593 | .407 | -100.0000 |
| 14.00 | .558 | .442 | -100.0000 |
| 14.50 | .528 | .472 | -93.0952 |
| 15.00 | .500 | .500 | -100.0000 |
| 15.50 | .475 | .525 | -100.0000 |
| 16.00 | .453 | .547 | -100.0000 |
| 16.50 | .432 | .568 | -77.4365 |
| 17.00 | .414 | .586 | -100.0000 |
| 17.50 | .397 | .603 | -87.9642 |
| 18.00 | .382 | .618 | -100.0000 |
| 18.50 | .368 | .632 | -71.6179 |
| 19.00 | .355 | .645 | -100.0000 |
| 19.50 | .344 | .656 | -100.0000 |
| 20.00 | .333 | .667 | -100.0000 |
| 20.50 | .324 | .676 | -75.2527 |
| 21.00 | .315 | .685 | -76.2785 |
| 21.50 | .307 | .693 | -79.8730 |
| 22.00 | .300 | .700 | -78.6754 |
| 22.50 | .293 | .707 | -100.0000 |
| 23.00 | .287 | .713 | -100.0000 |
| 23.50 | .281 | .719 | -100.0000 |
| 24.00 | .276 | .724 | -100.0000 |
| 24.50 | .272 | .728 | -86.2997 |
| 25.00 | .268 | .732 | -100.0000 |
| 25.50 | .264 | .736 | -100.0000 |
| 26.00 | .261 | .739 | -100.0000 |
| 26.50 | .259 | .741 | -100.0000 |
| 27.00 | .257 | .743 | -100.0000 |
| 27.50 | .254 | .746 | -100.0000 |
| 28.00 | .253 | .747 | -94.7900 |
| 28.50 | .251 | .749 | -100.0000 |
| 29.00 | .251 | .749 | -100.0000 |
| 29.50 | .250 | .750 | -100.0000 |
| 30.00 | .250 | .750 | -100.0000 |
| 30.50 | .250 | .750 | -98.7836 |
| 31.00 | .251 | .749 | -90.5476 |
| 31.50 | .251 | .749 | -100.0000 |
| 32.00 | .253 | .747 | -100.0000 |
| 32.50 | .254 | .746 | -100.0000 |
| 33.00 | .257 | .743 | -80.8874 |
| 33.50 | .259 | .741 | -85.2374 |
| 34.00 | .261 | .739 | -82.3512 |
| 34.50 | .264 | .736 | -100.0000 |
| 35.00 | .268 | .732 | -100.0000 |
| 35.50 | .272 | .728 | -75.9153 |
| 36.00 | .276 | .724 | -98.9377 |
| 36.50 | .281 | .719 | -100.0000 |
| 37.00 | .287 | .713 | -100.0000 |
| 37.50 | .293 | .707 | -100.0000 |
| 38.00 | .300 | .700 | -80.5545 |
| 38.50 | .307 | .693 | -83.5924 |
| 39.00 | .315 | .685 | -81.8559 |
| 39.50 | .324 | .676 | -82.7313 |

*Fig. 7a*

| | | | |
|---|---|---|---|
| 40.00 | .333 | .667 | -100.0000 |
| 40.50 | .344 | .656 | -100.0000 |
| 41.00 | .355 | .645 | -100.0000 |
| 41.50 | .368 | .632 | -100.0000 |
| 42.00 | .382 | .618 | -100.0000 |
| 42.50 | .397 | .603 | -100.0000 |
| 43.00 | .414 | .586 | -100.0000 |
| 43.50 | .432 | .568 | -100.0000 |
| 44.00 | .453 | .547 | -100.0000 |
| 44.50 | .475 | .525 | -99.0315 |
| 45.00 | .500 | .500 | -100.0000 |
| 45.50 | .500 | .500 | -43.6758 |
| 46.00 | .500 | .500 | -36.3855 |
| 46.50 | .500 | .500 | -31.8732 |
| 47.00 | .500 | .500 | -28.6065 |
| 47.50 | .500 | .500 | -26.0864 |
| 48.00 | .500 | .500 | -24.0825 |
| 48.50 | .500 | .500 | -22.4680 |
| 49.00 | .500 | .500 | -21.1654 |
| 49.50 | .500 | .500 | -20.1245 |
| 50.00 | .500 | .500 | -19.3112 |
| 50.50 | .500 | .500 | -18.7022 |
| 51.00 | .500 | .500 | -18.2811 |
| 51.50 | .500 | .500 | -18.0376 |
| 52.00 | .500 | .500 | -17.9653 |
| 52.50 | .500 | .500 | -18.0618 |
| 53.00 | .500 | .500 | -18.3281 |
| 53.50 | .500 | .500 | -18.7688 |
| 54.00 | .500 | .500 | -19.3924 |
| 54.50 | .500 | .500 | -20.2121 |
| 55.00 | .500 | .500 | -21.2471 |
| 55.50 | .500 | .500 | -22.5244 |
| 56.00 | .500 | .500 | -24.0822 |
| 56.50 | .500 | .500 | -25.9761 |
| 57.00 | .500 | .500 | -28.2887 |
| 57.50 | .500 | .500 | -31.1494 |
| 58.00 | .500 | .500 | -34.7767 |
| 58.50 | .500 | .500 | -39.5814 |
| 59.00 | .500 | .500 | -46.4877 |
| 59.50 | .500 | .500 | -58.4461 |
| 60.00 | .500 | .500 | -100.0000 |
| 60.50 | .500 | .500 | -58.4492 |
| 61.00 | .500 | .500 | -46.4893 |
| 61.50 | .500 | .500 | -39.5825 |
| 62.00 | .500 | .500 | -34.7775 |
| 62.50 | .500 | .500 | -31.1500 |
| 63.00 | .500 | .500 | -28.2892 |
| 63.50 | .500 | .500 | -25.9765 |
| 64.00 | .500 | .500 | -24.0826 |
| 64.50 | .500 | .500 | -22.5246 |
| 65.00 | .500 | .500 | -21.2473 |
| 65.50 | .500 | .500 | -20.2123 |
| 66.00 | .500 | .500 | -19.3925 |
| 66.50 | .500 | .500 | -18.7689 |
| 67.00 | .500 | .500 | -18.3281 |
| 67.50 | .500 | .500 | -18.0618 |
| 68.00 | .500 | .500 | -17.9653 |
| 68.50 | .500 | .500 | -18.0376 |
| 69.00 | .500 | .500 | -18.2811 |
| 69.50 | .500 | .500 | -18.7021 |

*Fig. 7b*

| | | | |
|---|---|---|---|
| 70.00 | .500 | .500 | −19.3111 |
| 70.50 | .500 | .500 | −20.1243 |
| 71.00 | .500 | .500 | −21.1652 |
| 71.50 | .500 | .500 | −22.4677 |
| 72.00 | .500 | .500 | −24.0822 |
| 72.50 | .500 | .500 | −26.0860 |
| 73.00 | .500 | .500 | −28.6059 |
| 73.50 | .500 | .500 | −31.8724 |
| 74.00 | .500 | .500 | −36.3844 |
| 74.50 | .500 | .500 | −43.6739 |
| 75.00 | .500 | .500 | −100.0000 |
| 75.50 | .475 | .525 | −98.4474 |
| 76.00 | .453 | .547 | −100.0000 |
| 76.50 | .432 | .568 | −100.0000 |
| 77.00 | .414 | .586 | −100.0000 |
| 77.50 | .397 | .603 | −100.0000 |
| 78.00 | .382 | .618 | −100.0000 |
| 78.50 | .368 | .632 | −89.1559 |
| 79.00 | .355 | .645 | −100.0000 |
| 79.50 | .344 | .656 | −100.0000 |
| 80.00 | .333 | .667 | −100.0000 |
| 80.50 | .324 | .676 | −82.8001 |
| 81.00 | .315 | .685 | −81.9434 |
| 81.50 | .307 | .693 | −83.6891 |
| 82.00 | .300 | .700 | −80.6275 |
| 82.50 | .293 | .707 | −100.0000 |
| 83.00 | .287 | .713 | −100.0000 |
| 83.50 | .282 | .718 | −75.7715 |
| 84.00 | .276 | .724 | −99.4288 |
| 84.50 | .272 | .728 | −75.9418 |
| 85.00 | .268 | .732 | −100.0000 |
| 85.50 | .264 | .736 | −100.0000 |
| 86.00 | .261 | .739 | −82.3867 |
| 86.50 | .259 | .741 | −85.3056 |
| 87.00 | .257 | .743 | −80.9171 |
| 87.50 | .254 | .746 | −100.0000 |
| 88.00 | .253 | .747 | −100.0000 |
| 88.50 | .251 | .749 | −100.0000 |
| 89.00 | .251 | .749 | −90.6849 |
| 89.50 | .250 | .750 | −98.9121 |
| 90.00 | .250 | .750 | −100.0000 |
| 90.50 | .250 | .750 | −100.0000 |
| 91.00 | .251 | .749 | −100.0000 |
| 91.50 | .251 | .749 | −100.0000 |
| 92.00 | .253 | .747 | −94.8685 |
| 92.50 | .254 | .746 | −100.0000 |
| 93.00 | .257 | .743 | −100.0000 |
| 93.50 | .259 | .741 | −100.0000 |
| 94.00 | .261 | .739 | −100.0000 |
| 94.50 | .264 | .736 | −100.0000 |
| 95.00 | .268 | .732 | −100.0000 |
| 95.50 | .272 | .728 | −86.2804 |
| 96.00 | .276 | .724 | −100.0000 |
| 96.50 | .281 | .719 | −100.0000 |
| 97.00 | .287 | .713 | −100.0000 |
| 97.50 | .293 | .707 | −100.0000 |
| 98.00 | .300 | .700 | −78.6036 |
| 98.50 | .307 | .693 | −79.7995 |
| 99.00 | .315 | .685 | −76.2024 |

*Fig. 7c*

| FREQUENCY | AMPLITUDE "A" | "B" | FARFIELD (dB) |
|---|---|---|---|
| 10.00 | .779 | .221 | -100.0000 |
| 10.50 | .779 | .221 | -100.0000 |
| 11.00 | .779 | .221 | -100.0000 |
| 11.50 | .779 | .221 | -100.0000 |
| 12.00 | .724 | .276 | -100.0000 |
| 12.50 | .675 | .325 | -100.0000 |
| 13.00 | .631 | .369 | -97.1075 |
| 13.50 | .593 | .407 | -100.0000 |
| 14.00 | .558 | .442 | -100.0000 |
| 14.50 | .528 | .472 | -95.1602 |
| 15.00 | .500 | .500 | -100.0000 |
| 15.50 | .475 | .525 | -100.0000 |
| 16.00 | .453 | .547 | -100.0000 |
| 16.50 | .432 | .568 | -77.9249 |
| 17.00 | .414 | .586 | -100.0000 |
| 17.50 | .397 | .603 | -87.6921 |
| 18.00 | .382 | .618 | -100.0000 |
| 18.50 | .368 | .632 | -70.5280 |
| 19.00 | .355 | .645 | -100.0000 |
| 19.50 | .344 | .656 | -100.0000 |
| 20.00 | .333 | .667 | -100.0000 |
| 20.50 | .324 | .676 | -72.2036 |
| 21.00 | .315 | .685 | -72.6235 |
| 21.50 | .307 | .693 | -75.5312 |
| 22.00 | .300 | .700 | -73.5614 |
| 22.50 | .293 | .707 | -100.0000 |
| 23.00 | .287 | .713 | -100.0000 |
| 23.50 | .281 | .719 | -100.0000 |
| 24.00 | .276 | .724 | -95.9709 |
| 24.50 | .272 | .728 | -73.6298 |
| 25.00 | .268 | .732 | -100.0000 |
| 25.50 | .264 | .736 | -100.0000 |
| 26.00 | .261 | .739 | -82.9548 |
| 26.50 | .259 | .741 | -86.9077 |
| 27.00 | .257 | .743 | -83.7514 |
| 27.50 | .254 | .746 | -100.0000 |
| 28.00 | .253 | .747 | -100.0000 |
| 28.50 | .251 | .749 | -100.0000 |
| 29.00 | .251 | .749 | -100.0000 |
| 29.50 | .250 | .750 | -100.0000 |
| 30.00 | .250 | .750 | -100.0000 |
| 30.50 | .250 | .750 | -100.0000 |
| 31.00 | .251 | .749 | -100.0000 |
| 31.50 | .251 | .749 | -100.0000 |
| 32.00 | .253 | .747 | -100.0000 |
| 32.50 | .254 | .746 | -100.0000 |
| 33.00 | .257 | .743 | -83.7457 |
| 33.50 | .259 | .741 | -86.8882 |
| 34.00 | .261 | .739 | -82.9356 |
| 34.50 | .264 | .736 | -100.0000 |
| 35.00 | .268 | .732 | -100.0000 |
| 35.50 | .272 | .728 | -73.6161 |
| 36.00 | .276 | .724 | -95.7130 |
| 36.50 | .281 | .719 | -100.0000 |
| 37.00 | .287 | .713 | -100.0000 |
| 37.50 | .293 | .707 | -100.0000 |
| 38.00 | .300 | .700 | -73.5252 |
| 38.50 | .307 | .693 | -75.4772 |
| 39.00 | .315 | .685 | -72.5847 |
| 39.50 | .324 | .676 | -72.1578 |

*Fig. 6a*

| Hz | NORMALIZE "A" | FORCE OUTPUT "B" | FARFIELD RAYLEIGH WAVE LEVEL (DB) VIEWING ANGLE (RADIANS) | | | |
|---|---|---|---|---|---|---|
| | | | 0.0 | 0.1 | 0.2 | 0.314 |
| 10.50 | .750 | .250 | -17.5269 | -17.5268 | -17.5266 | -17.5264 |
| 11.00 | .750 | .250 | -21.5248 | -21.5246 | -21.5240 | -21.5236 |
| 11.50 | .750 | .250 | -28.4400 | -28.4390 | -28.4371 | -28.4359 |
| 12.00 | .744 | .256 | -100.0000 | -100.0000 | -100.0000 | -97.4759 |
| 12.50 | .700 | .300 | -100.0000 | -100.0000 | -100.0000 | -94.5340 |
| 13.00 | .661 | .339 | -100.0000 | -100.0000 | -99.3592 | -91.7820 |
| 13.50 | .627 | .373 | -100.0000 | -100.0000 | -96.6942 | -89.1147 |
| 14.00 | .596 | .404 | -100.0000 | -100.0000 | -94.1479 | -86.5535 |
| 14.50 | .570 | .430 | -100.0000 | -100.0000 | -91.6699 | -84.0740 |
| 15.00 | .546 | .454 | -100.0000 | -100.0000 | -89.2739 | -81.6751 |
| 15.50 | .525 | .475 | -100.0000 | -100.0000 | -86.9616 | -79.3541 |
| 16.00 | .506 | .494 | -100.0000 | -100.0000 | -84.7200 | -77.1021 |
| 16.50 | .489 | .511 | -100.0000 | -100.0000 | -82.5108 | -74.9040 |
| 17.00 | .475 | .525 | -100.0000 | -100.0000 | -80.3950 | -72.7788 |
| 17.50 | .462 | .538 | -100.0000 | -100.0000 | -78.3153 | -70.7017 |
| 18.00 | .450 | .550 | -100.0000 | -100.0000 | -76.2985 | -68.6836 |
| 18.50 | .440 | .560 | -100.0000 | -100.0000 | -74.3321 | -66.7132 |
| 19.00 | .432 | .568 | -100.0000 | -100.0000 | -72.3974 | -64.7835 |
| 19.50 | .425 | .575 | -100.0000 | -100.0000 | -70.5176 | -62.9022 |
| 20.00 | .419 | .581 | -100.0000 | -100.0000 | -68.6709 | -61.0581 |
| 20.50 | .415 | .585 | -100.0000 | -100.0000 | -66.8686 | -59.2518 |
| 21.00 | .412 | .588 | -100.0000 | -100.0000 | -65.0893 | -57.4721 |
| 21.50 | .410 | .590 | -100.0000 | -100.0000 | -63.3260 | -55.7097 |
| 22.00 | .412 | .588 | -100.0000 | -100.0000 | -61.5548 | -53.9374 |
| 22.50 | .424 | .576 | -100.0000 | -100.0000 | -59.6247 | -52.0049 |
| 23.00 | .250 | .750 | -100.0000 | -100.0000 | -60.3877 | -53.9833 |
| 23.50 | .380 | .620 | -100.0000 | -100.0000 | -57.3678 | -49.7464 |
| 24.00 | .391 | .609 | -100.0000 | -100.0000 | -55.5951 | -47.9697 |
| 24.50 | .397 | .603 | -100.0000 | -100.0000 | -53.9786 | -46.3501 |
| 25.00 | .402 | .598 | -100.0000 | -100.0000 | -52.4200 | -44.7887 |
| 25.50 | .408 | .592 | -100.0000 | -100.0000 | -50.9027 | -43.2656 |
| 26.00 | .414 | .586 | -100.0000 | -100.0000 | -49.4140 | -41.7702 |
| 26.50 | .421 | .579 | -100.0000 | -100.0000 | -47.9540 | -40.3000 |
| 27.00 | .429 | .571 | -100.0000 | -100.0000 | -46.5140 | -38.8495 |
| 27.50 | .439 | .561 | -100.0000 | -100.0000 | -45.0984 | -37.4192 |
| 28.00 | .450 | .550 | -100.0000 | -100.0000 | -43.7048 | -36.0071 |
| 28.50 | .462 | .538 | -100.0000 | -100.0000 | -42.3350 | -34.6129 |
| 29.00 | .475 | .525 | -100.0000 | -100.0000 | -40.9866 | -33.2347 |
| 29.50 | .491 | .509 | -100.0000 | -100.0000 | -39.6670 | -31.8748 |
| 30.00 | .508 | .492 | -100.0000 | -100.0000 | -38.3738 | -30.5313 |

Fig. 8a

| Hz | "A" | "B" | 0.0 | 0.1 | 0.2 | 0.314 |
|---|---|---|---|---|---|---|
| 31.00 | .549 | .451 | -100.0000 | -100.0000 | -35.8895 | -27.9002 |
| 31.50 | .573 | .427 | -100.0000 | -100.0000 | -34.7128 | -26.6170 |
| 32.00 | .599 | .401 | -100.0000 | -100.0000 | -33.5918 | -25.3593 |
| 32.50 | .628 | .372 | -100.0000 | -100.0000 | -32.5460 | -24.1344 |
| 33.00 | .660 | .340 | -100.0000 | -100.0000 | -31.5977 | -22.9501 |
| 33.50 | .695 | .305 | -100.0000 | -100.0000 | -30.7824 | -21.8188 |
| 34.00 | .733 | .267 | -100.0000 | -100.0000 | -30.1496 | -20.7566 |
| 34.50 | .750 | .250 | -100.0000 | -100.0000 | -33.8158 | -21.0665 |
| 35.00 | .750 | .250 | -100.0000 | -100.0000 | -100.0000 | -22.6102 |
| 35.50 | .750 | .250 | -100.0000 | -100.0000 | -100.0000 | -24.4072 |
| 36.00 | .750 | .250 | -100.0000 | -100.0000 | -100.0000 | -26.5089 |
| 36.50 | .750 | .250 | -100.0000 | -100.0000 | -100.0000 | -28.9837 |
| 37.00 | .750 | .250 | -100.0000 | -100.0000 | -100.0000 | -31.9185 |
| 37.50 | .750 | .250 | -100.0000 | -100.0000 | -100.0000 | -35.4054 |
| 38.00 | .750 | .250 | -100.0000 | -100.0000 | -100.0000 | -39.4509 |
| 38.50 | .750 | .250 | -100.0000 | -100.0000 | -100.0000 | -43.5799 |

*Fig. 8b*

SOURCE TUNABLE ARRAY FOR GROUND ROLL REDUCTION

This application is a continuation of application Ser. No. 707,919, filed Mar. 4, 1985, now abandoned.

BACKGROUND OF THE INVENTION

1. Field of the Invention

This invention relates to the reduction in Rayleigh waves (ground roll) in land seismic exploration. More particularly, it pertains to Rayleigh wave reduction through the selection of appropriate amplitude outputs from vibrator sources, coupled with the selection of appropriate separations between the vibrator sources.

2. Description of the Prior Art

Rayleigh waves (ground roll) is a seismic source noise that has plagued reflection seismology work for years. This surface wave travels at roughly half the speed of the coincident pressure wave and generally arrives at the receiver array from the vibrator sources at about the same time as pressure wave reflections from moderate depth targets. The surface wave is a coherent noise source and therefore cannot be effectively filtered in the frequency domain without reducing the signal energy in the same bandwidth.

Two prior art systems of suppressing Rayleigh waves are receiver array placement and velocity filtering. The receiver array system requires additional geophones to be used in the spread. Seismic data collection systems in current use typically use 200 to 500 geophone groups. For in-line suppression of 10 dB over three octaves, six or more geophones are needed per group. For omni directional suppression of 10 dB over three octaves, 20 or more geophones are required per group. The deployment and proper positioning of large numbers of geophones is labor intensive. Also, as the number of geophones is increased, so is the probability of equipment failure.

The system of velocity filtering is an off-line processing technique which exploits the fact that pressure waves travel faster than Rayleigh waves. For good suppression using velocity filtering, good static information, (terrain elevation), fine spatial sampling, (close group spacing) is required and a smooth transition in the acoustic properties of the weathered layer form group-to-group (no amplitude) anomalies due to receiver coupling variations. Furthermore, velocity filtering requires that the resolution of the data acquisition system be high enough so that low-level pressure wave signals can be recovered from the raw signal which is contaminated by relatively high level surface wave noise.

A relatively new system is described and claimed in copending U.S. patent application Ser. No. 790,794, filed Oct. 24, 1985, a continuation application of Ser. No. 516,409 now abandoned—"Attenuation of Source-Generated Noise in a Seismic Exploration System on a Floating Ice Layer" filed on July 22, 1983 and assigned to the assignee of this invention. This described system creates a baffle between the seismic sources and receivers by cutting a slit in the ice. A reduction of source generated flexure waves on the order of 10 dB has been measured. The method requires that a slit on the order of a mile be cut in the ice, which means that additional heavy machinery be built, transported and maintained. The extension of this technique to land based operations is not practical from an environment impact standpoint and, of course, from the standpoint of the equipment required to cut a mile long trough in the earth.

The present invention may be used in conjunction with either the receiver array technique or the velocity filtering system to achieve higher signal to noise ratios. It may also be used in place of complex receiver arrays to achieve the same amount of suppression without requiring the deployment of large numbers of geophones. Because the amount of surface wave noise generated by the seismic vibrators is actually reduced in the direction of the geophone, the need for high resolution data acquisition is diminished. By monitoring the Rayleigh wave velocity at the source, the seismic vibrator array can be automatically adjusted locally to achieve the greatest reduction in source generated Rayleigh waves.

BRIEF SUMMARY OF THE INVENTION

This inventive system requires that there be a system for amplitude control of the vibrator source outputs. The control described and claimed in copending U.S. patent application Ser. No. 435,124, entitled "A Vibrator Seismic source Having Distortion Limiting Control System", filed Oct. 18, 1982 now U.S. Pat. No. 4,616,352, issued Oct. 7, 1986, may be used for this system.

Also required is an algorithm to calculate the amplitude versus frequency function for each vibrator in the source array.

A system which may be used for transmission of the appropriate amplitude versus frequency function for each vibrator is claimed and described in copending U.S. patent application Ser. No. 896,342, filed Aug. 15, 1986, a continuation application of Ser. No. 595,856 (now abandoned) entitled "Seismic Source Vibrator Having Improved Sweep Generator", filed Apr. 2, 1984 and assigned to the assignee of this invention.

Measuring the Rayleigh wave velocity in the weathered layer at the source is required.

In general, a different ground force (amplitude) versus frequency output function is required for each source. Only the amplitude output of each source is changed, phase is not disturbed, thereby insuring that the phase of the down going signal (pressure signal) is not altered and the pressure wave radiation pattern remains virtually unaltered. The algorithm is designed to minimize the Rayleigh wave output in given directions of the source array for a given number of vibrators at given spacings. In this manner, the Rayleigh waves from each vibrator source tend to cancel each other. The ideal result would be a zero Rayleigh wave at the far-field receiver, but is not practically obtainable. By selecting the proper output amplitude with the proper separations between vibrator sources, the Rayleigh wave is minimized.

The principal object of this invention is to reduce Rayleigh waves resulting from the normal use of vibrator sources by controlling the output amplitudes and separation of the sources.

Another object of this invention is to control Rayleigh waves by controlling the amplitudes and separation of the sources together with the receiver array and/or the velocity filtering techniques.

Still another object of this invention is to control Rayleigh waves resulting from in line vibrator sources with respect to far-field receivers.

Still another object of this invention is to reduce Rayleigh waves of vibrator sources arranged in concentric circles for three-dimensional exploration by proper selection of amplitude outputs and separations.

These and other objects will be made evident in the detailed description that follows.

BRIEF DESCRIPTION OF THE DRAWINGS

FIG. 5 illustrates amplitude in dB versus frequency for the resultant Rayleigh wave measured at the receiver.

FIGS. 6a-6c are tables illustrating vibrator output amplitudes at various frequencies and the resultant far field Rayleigh wave response.

FIGS. 7a-7c are tables similar to FIGS. 6a-6c, representating values after a 25 ft. moveup.

FIGS. 8a and 8b are tables illustrating vibrator output amplitudes at various frequencies and resultant Rayleigh wave response for 3-D survey.

DETAILED DESCRIPTION

Figure 1:
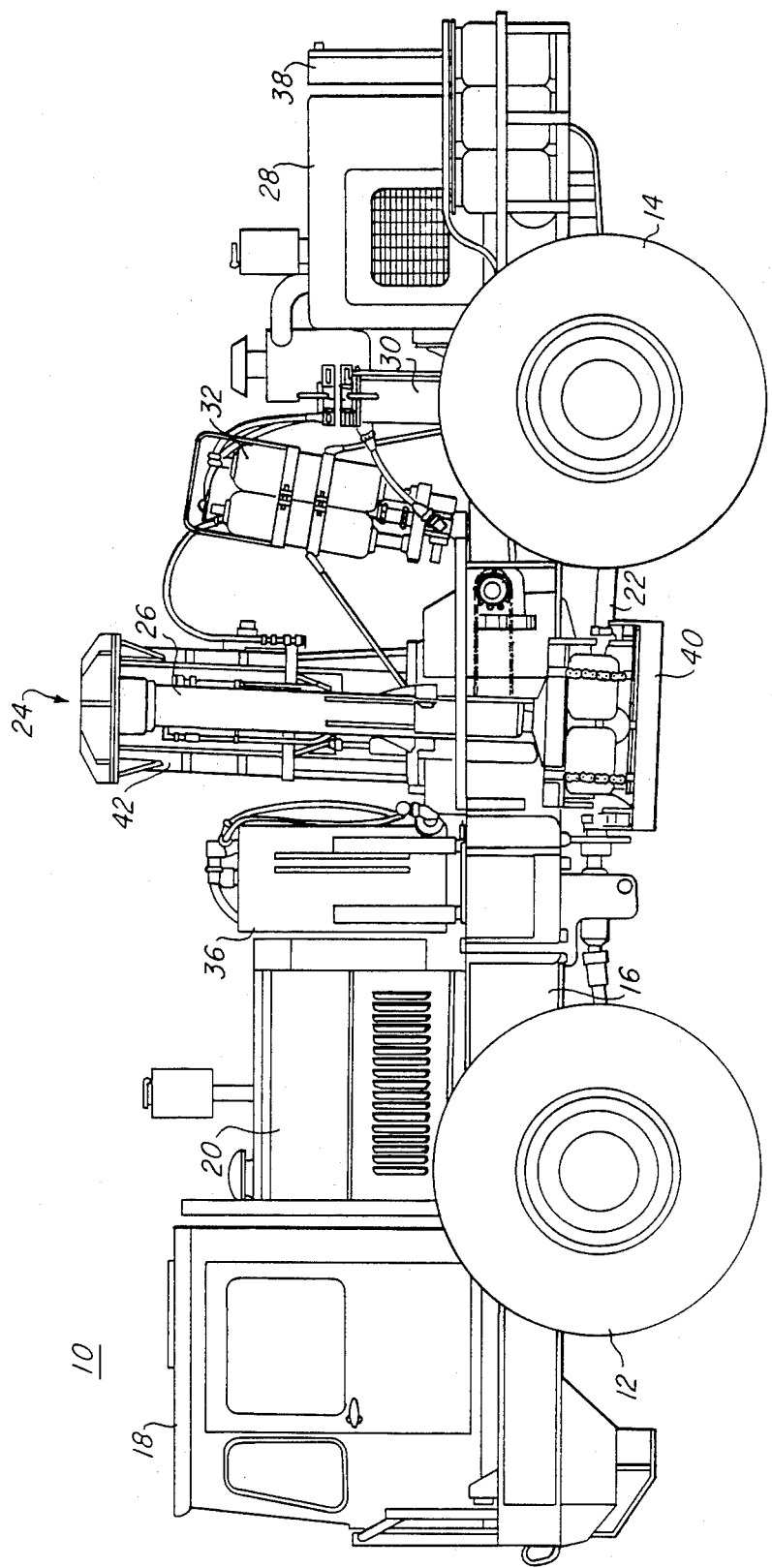
FIG. 1 illustrates a typical vibrator for use in this invention.

This invention utilizes the force output of vibrator sources and separations between those sources to reduce Rayleigh waves by tuning the outputs and the separations between sources. For a full understanding of this invention, please start first with FIG. 1.

A vehicle 10 having front and rear wheels 12 and 14, respectively, supports a chassis. Vibrator assembly 24 is disposed between the front (12) and rear (14) wheels and connected to the frame member 16 of the truck by a lift system 26. A prime mover or engine 28, main hydraulic pump 30, high pressure accumulator system 32, hydraulic tank 36, hydraulic tank cooler 38 and associated hydraulic plumbing may be located on the frame member 16 as shown.

Figure 2:
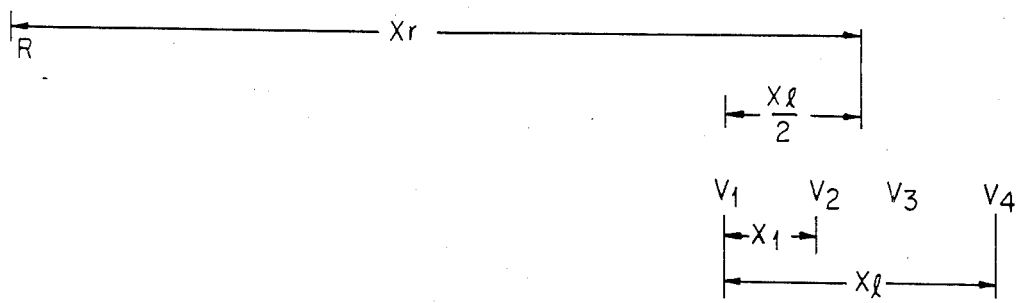
FIG. 2 schematically illustrates the position of the vibrators and the receiver in this invention.

FIG. 2 schematically illustrates vibrators V1-V4 in a single line and, in this preferred embodiment, shown having equal separations. The receiver R is at a distance Xr from the center point of the in-line array of vibrators V1-V4. V1 is located at a distance from receiver R that is more than twice the wavelength of the lowest frequency to be used in the sweep and thereby locating receiver R in the far-field. The objective is to suppress Rayleigh waves over a particular range of frequencies which, in this preferred embodiment, is at least 15 to 30 Hz. To solve the problem, the velocity of the Rayleigh wave must first be established. There are several methods of determining velocity. In this preferred embodiment, a direct measurement of the Rayleigh wave velocity between sources can be made. As Rayleigh waves propagate, the particle motion at the surface is elliptical. Therefore, Rayleigh waves may be sensed by using either vertical or horizontal geophones. Two horizontal geophones placed at a known separation distance are useful for determining Rayleigh wave velocity. A vibrator can be commanded to pulse. The quotient of the separation distance and time difference between when the pulse is received at the two horizontal receivers is the velocity of the Rayleigh wave in the earth, between the receiver positions. A vibroseis sweep may also be used instead of the pulse method.

Another method employs the sensors located on the vibrator baseplates. All the vibrators are equipped with baseplate motion detectors which are used for phase locking to a reference signal. See, for example, U.S. Pat. No. 3,979,715—"Method and System for Achieving Vibrator Phase Lock". This is done by commanding the lead vibrator to do a special sweep while the other vibrators have their baseplates in contact with the earth. Each unit is capable of A/D conversion of the baseplate signal and correlation of the received signal with the transmitted signal. The Rayleigh wave one way travel time can be measured by taking the time lag of the cross-correlation for which a maximum occurs. At distances of less than 100 meters, Rayleigh wave power dominates other modes of seismic wave propagation. Each vibrator source at this point has measured the Rayleigh wave one way travel time from the leader to itself. Next, a measurement of the actual distance separating the vibrators from the lead vibrator is made. A simple division then provides the Rayleigh wave velocity. In this preferred embodiment, a Rayleigh wave velocity of 3,000 ft. per second was determined.

Having determined the Rayleigh wave velocity (c), the algorithm must be solved for maximum suppression of the Rayleigh wave. To insure that the apparent center of the array (between units V2 and V3 of FIG. 2) is frequency invariant, a(f) will be the force output weighting of vibrators V1 and V4 and b(f) will be the force output weighting of vibrators V2 and V3. Then at frequency f:

$$R(t,f) = k(f) * \left[ a\cos\left(2pi*f*t - \frac{2pi*f}{c}\left(Xr - \frac{3*X1}{2}\right)\right) + \right.$$

$$b\cos\left(2pi*f*t - \frac{2pi*f}{c}\left(Xr - \frac{X1}{2}\right)\right) +$$

$$b\cos\left(2pi*f*t - \frac{2pi*f}{c}\left(Xr + \frac{X1}{2}\right)\right) +$$

$$\left. a\cos\left(2pi*f*t - \frac{2pi*f}{c}\left(Xr + \frac{3*X1}{2}\right)\right) \right] \quad (1)$$

(wherein k(f) is an attenuation constant).

Letting $q=a/b$, where b is not equal to 0, equation 1 may be simplified and transformed to the following equation in which $r'(f)$ is proportional to R(t,f) by a constant of attentuation and absolute amplitude:

$$r'(f) = 2\cos\frac{(pi*f*X1)}{c}[(1 - 2\cos(2pi*f*X1))q - 1] \quad (2)$$

By setting $r'(f)=0$ and solving for q and X1, no Rayleigh wave would be measured at the receiver. Because of practical limitations the range of solutions for q is limited; q must be greater than or equal to ⅓ and less than or equal to 3.0. Negative values for q are not allowed since that would require two vibrators to be 180° out of phase with the other two vibrators. This is an undesirable combination since it would also greatly reduce the downgoing pressure wave energy. Also, it is undesirable to let one or more vibrators vibrate at less than 25% of their rated capacity due to the possibility of losing synchronization of the vibrators with one another, and with the pilot or reference signal. Neither should the vibrators be vibrated at greater than 100% because of the possibility of decoupling.

Setting equation (2)=0;

$$q = \frac{1}{1 - 2\cos\frac{(2pi*f*X1)}{c}} \quad (3)$$

With $c = 3000$ ft/sec
$X1 = 50$ ft $$q = \frac{1}{1 - 2\cos\frac{(2pi*f*50)}{3000}} \quad (4)$$

If a flat downgoing p-wave power spectrum is desired as shown in this preferred embodiment, the sum of the contributions of each element of the array must be constant with frequency, reflected by the equation:

$$a + b = k' \text{ but } o = \frac{a}{b} \text{ Then } a = \frac{q*k'}{1+q} \text{ and } b = \frac{k'}{1+q}$$

The values for a and b as shown in FIGS. 6a–6c are determined by evaluating equation 4 for each frequency in the sweep. These tables represent a situation where the total downgoing p wave amplitude is to remain constant, vibrators V1 and V4 are producing an output force of "a" and vibrators V2 and V3 are producing an output force of "b". In FIG. 5, the solid line curve 50 illustrates the reduction of more than 70 dB in the Rayleigh wave starting at approximately 10 Hz and ending at approximately 50 Hz, with no Rayleigh wave suppression being shown at approximately 60 Hz. Suppression resumes from 70 to 110 Hz.

Figure 4:
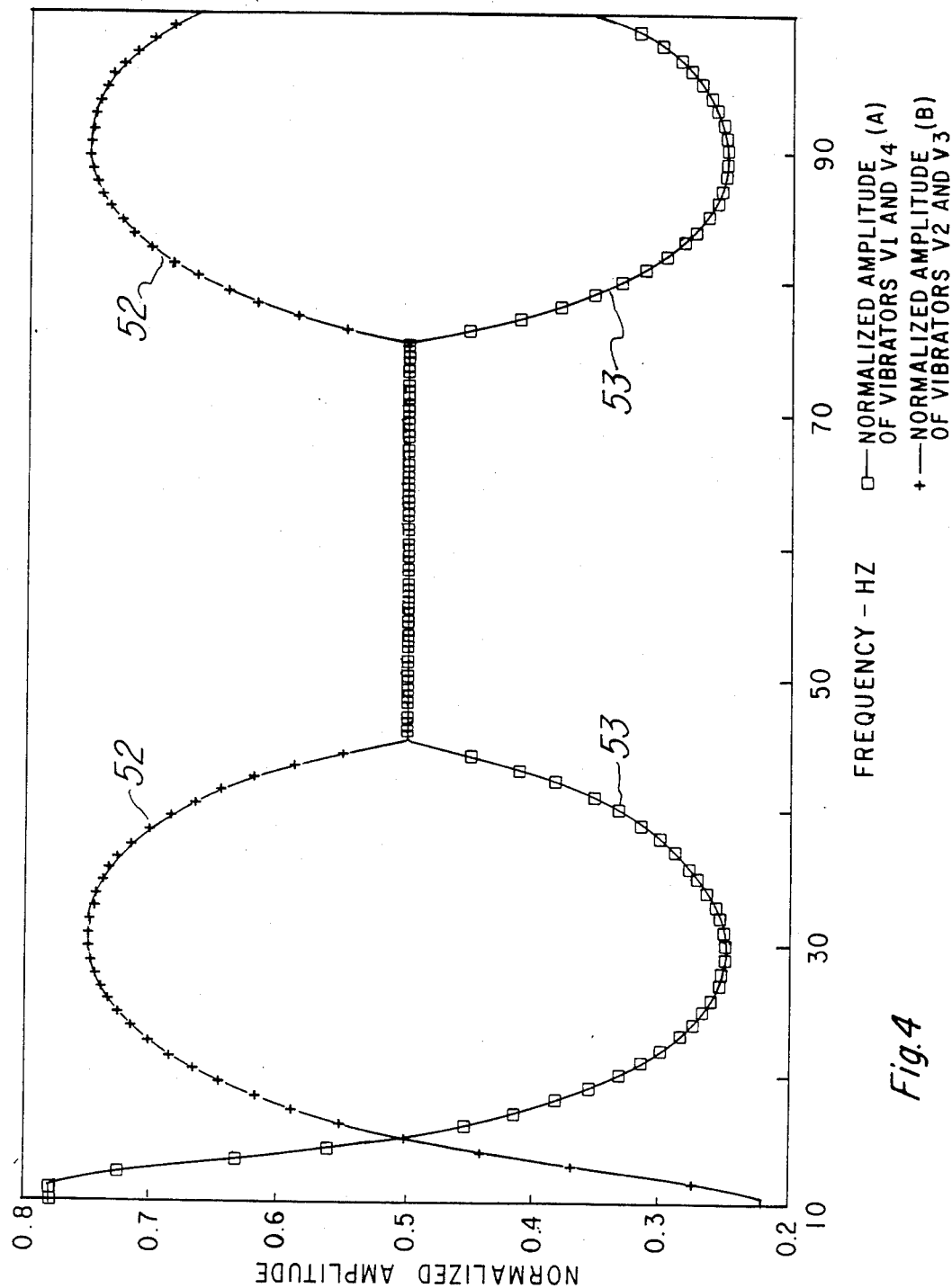
FIG. 4 illustrates the normalized amplitude of the vibrator output against frequency.

To maintain a constant downgoing force, FIG. 4 illustrates the various values of a normalized amplitude of output force (a) shown as curve 53 and the normalized output amplitude of vibrators V2 and V3 (b) shown as curve 52.

In addition to the resultant total compressive force remaining constant, this preferred embodiment also illustrates identical amplitudes from the pairs of vibrators. It should be evident that each vibrator may be tuned to provide a different force output. Also the example shown illustrates a separation between vibrators of 50 feet. This separation may, of course, be changed, and the individual separations may be changed.

The constant total force output may also be changed. For example, a total force which increases directly with frequency could be implemented to enhance high frequency output.

It is common practice in seismic exploration to "move up" the line of vibrators a given distance. FIGS. 7a–7c are tables that represent the values obtained through a 25 foot move up of each vibrator added to the values obtained before the moveup. The resultant curve is shown in FIG. 5 as dashed curve 51. For this example, the use of move up is effective in suppressing ground roll at approximately 60 Hz, in addition to the suppression noted above.

A single vibrator could produce the results of the four vibrators if the dynamic range of the recording system is adequate simply by sweeping a single vibrator in each position and providing it with exactly the same frequency and amplitude information as the vibrator that had previously occupied that position. By numerically combining the results of the four sweeps produced at the four positions (or eight sweeps in the case of the 25 ft. move up) and recording the sum, the Rayleigh wave on the resultant receiver recording will be reduced in exactly the same manner.

In conducting three-dimensional (3-D) surveys, it is desirable to suppress Rayleigh waves over a range of angles rather than in just one or two directions. For 3-D surveys, geophone lines are layed out parallel to one another. The path of the vibrators takes them back and forth between the lines. However, not all of the geophones are active. That is, the geophones which are broad side to a vibrator are turned off, and only those geophones located in front of or behind the vibrator are active.

Figure 3:
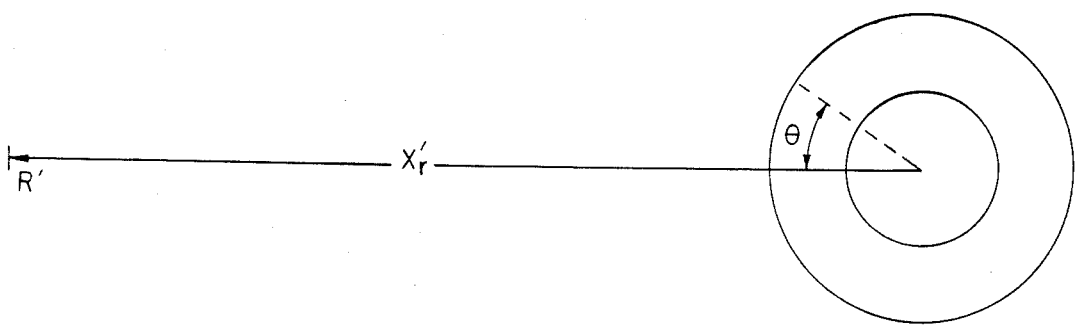
FIG. 3 illustrates possible positions of vibrators and the receiver for 3-D work.

In this preferred embodiment, the vibrator array and accompanying frequency variant amplitude function is derived by considering the limiting case. Assume that the angular range over which the Rayleigh waves are to be suppressed is from 0° to 360° and that the vibrators are "ring sources" rather than point sources. FIG. 3 illustrates this configuration. The outer radius is r0 and the inner radius is r1. The amplitude of the outer ring of radius r0 is $$\frac{a}{2pi*r0}.$$

The amplitude of inner ring of radius r1 is $$\frac{b}{2pi*r1}$$

The receiver R' is located at distance Xr' from the circles' center. The contribution of the outer ring to the Rayleigh wave received by R' is given by:

$$I1 = \int_0^{2\pi} \frac{aK}{2pi*r0} \cos\left(2pi*f*t - \frac{2pi*f}{c}(Xr' - r0\cos\emptyset)\right) d\emptyset$$

Through mathematical reduction, $$I1 = \frac{ka}{r0} \cos\left(2pi*f*t - \frac{2pi*f*Xr'}{c}\right) J_0 \frac{(2pi*f*r0)}{c}$$

wherein Jo(x) is a bessel function of the first kind of order zero.

Similarly, the contribution of the inner ring to the received output at Xr' is:

$$I2 = \frac{Kb}{r1} \cos\left(2pi*f*t - \frac{2pi*f*Xr'}{c}\right) J_0 \frac{(2pi*f*r1)}{c}$$

For the Rayleigh wave to be suppressed at the receiver, amplitudes "a" and "b" must be selected so that the sum of I1 and I2 is minimized. For complete suppression, the sum of I1 and I2 must be zero for arbitrary values of "t". With these conditions:

$$\frac{a}{b} = -\frac{r0\left(J_0 \frac{(2pi*f*r1)}{c}\right)}{r1\left(J_0 \frac{(2pi*f*r0)}{c}\right)}$$

In practice, there are no "ring" sources, however, for practical use this may be approximated by a finite number of point sources, evenly spaced on two concentric circles as shown on FIG. 3. The outer ring is comprised of vibrators V1–V10. The inner ring is comprised of vibrators V11–V20. The outer vibrators each have output "a", the inner vibrators have output "b".

As in the case of the two dimensional exploration described earlier, the magnitudes of a and b cannot be less than 25% of capacity or greater than 100%. For a flat output, the sum of a and b is a constant. Also, $q = a/b$, and q is equal to or greater than $\frac{1}{3}$ or equal to or less than 3.0.

Values for Jo(X) are available in tables such as found in "Handbook of Chemistry and Physics". In this preferred embodiment, r0 is 115 ft. and r1 is 50 ft. All of the vibrators are evenly spaced, that is, 36° apart. FIGS. 8a and 8b list the Rayleigh wave amplitude at varying viewing angles "$\theta$" resulting from various combinations of a and b at frequency Hz.

More or less vibrators may be employed as well as move up. While specific embodiments of this invention have been shown, it is understood that those skilled in the art may readily vary distances, amplitudes, numbers of vibrators and receivers, without departing from the scope of this invention which is limited only by the appended claims.

What is claimed is:

1. A method of reducing Rayleigh waves in land seismic exploration of a prospect wherein a plurality of vibrator sources spaced from each other by known separations and at least one receiver are employed, each vibrator producing an output signal having given phase, frequency and amplitude, comprising the steps of:
   (A) determining the velocity of the Rayleigh wave (C) in the prospect;
   (B) establishing a spacing between the plurality of vibrator sources and the receiver sufficient to establish the receiver as being in the far-field;
   (C) locking the output of each of the vibrator sources in phase and frequency to a known reference phase and a known reference frequency, respectively;
   (D) maintaining the known separations between the vibrator sources;
   (E) varying the known reference frequency over a range of discrete frequencies; and
   (F) varying the individual output amplitude of each vibrator source at the discrete frequencies so that the resultant Rayleigh waves traverse the known separations resulting in phase shifts which, at the individual output amplitude of each vibrator source and at the Rayleigh wave velocity, diminish the resultant amplitude of the Rayleigh waves received at the receiver.

2. The method of claim 1 wherein the step of determining the velocity of the Rayleigh wave comprises the steps of:
   (a)
   (i) measuring the time taken for a Rayleigh wave to traverse a measured distance; and
   (ii) dividing the distance by the time taken.

3. The method of claim 1 wherein the known separations are equal in distance (X1).

4. The method of claim 1 wherein the step of varing the individual output amplitudes comprises the step of adjusting the individual output amplitude of each vibrator source to provide a composite output from the plurality of vibrator sources having a constant amplitude for each of the discrete frequencies.

5. The method of claim 1 further comprising the step of positioning the plurality of vibrator sources in a straight line that essentially bisects the receiver.

6. The method of claim 5 wherein the plurality of vibrator sources comprise four vibrator sources and the step of varying the individual output amplitude comprises the step of adjusting the amplitudes (a) of the two outer vibrator sources to be equal to each other and the amplitudes (b) of the two inner vibrator sources to be equal to each other.

7. The method of claim 1 further including the step of positioning the plurality of vibrator sources in an inner circle of radius r1 and outer concentric circle of radius r0.

8. The method of claim 4 further including the step of positioning the plurality of vibrator sources in an inner circle of radius r1 and outer concentric circle of radius r0.

9. The method of claim 8 further comprising the step of equally spacing the vibrator sources in the outer circle and equally spacing the vibrator sources in the inner circle.

10. The method of claim 9 wherein the step of varying the individual output amplitude comprises the step of adjusting the amplitudes (a) of each of the vibrator sources in the outer circle to be equal to each other and the amplitudes (d) of each of the vibrator sources in the inner circle to be equal to each other.

11. A method of reducing Rayleigh waves in land seismic exploration of a prospect wherein a plurality of vibrator sources spaced from each other by known separations and at least one receiver are employed, each vibrator producing an output signal having given phase, frequency and amplitude, comprising the steps of:
   (a) determining the velocity of Rayleigh wave (c) in the prospect;
   (b) establishing a spacing between the plurality of vibrator sources and the receiver sufficient to establish the receiver as being in the far-field;
   (c) locking the output of each of the vibrator sources in phase and frequency to a known reference phase and a known reference frequency, respectively;
   (d) maintaining the known separations between the vibrator sources;
   (e) varying the known reference frequency over a range of discrete frequencies;
   (f) positioning four vibrator sources in a straight line that essentially bisects the receiver; and
   (g) adjusting the amplitudes a of two outer vibrator sources and the amplitudes b of two inner vibrator sources, and a distance X1 in the following algorithm to minimize the received Rayleigh wave:

$$\frac{a}{b} = \frac{1}{1 - 2\cos\frac{(2pi * f * x1)}{c}}$$

wherein:
c = velocity of the Rayleigh waves
f = a discrete frequency
pi = ratio of the circumference of a circle to its diameter
X1 = a known separation between two vibratory sources.

12. The method of claim 11 wherein amplitudes a and b may not be adjusted to less than approximately 0.25 maximum amplitude.

13. A method of reducing Rayleigh waves in land seismic exploration of a prospect wherein a plurality of vibrator sources spaced from each other by known separations and at least one receiver are employed, each vibrator producing an output signal having given phase, frequency and amplitude, comprising the steps of:
   (a) determining the velocity of the Rayleigh wave in the prospect;
   (b) establishing a spacing between the plurality of vibrator sources and the receiver sufficient to establish the receiver as being in the far-field;
   (c) locking the output of each of the vibrator sources in phase and frequency to a known reference phase and a known reference frequency, respectively;
   (d) maintaining the known separations between the vibrator sources;
   (e) varying the known reference frequency over a range of discrete frequencies; and
   (f) varying the individual output amplitude of each vibrator source at the discrete frequencies so that the resultant Rayleigh waves traverse the known separations resulting in phase shifts which, at the individual output amplitude of each vibrator source and at the Rayleigh wave velocity, diminish the resultant amplitude of the Rayleigh waves received at the receiver by positioning and equally spacing the plurality of vibrator sources in an inner circle of radius r1 and outer concentric circle of radius r0 adjusting the amplitudes a in the outer circle, and b in the inner circle and radii r0 and r1 in the following algorithm to minimize the received Rayleigh wave:

$$\frac{a}{b} = \frac{r0 \left( J_o \frac{(2pi*f*r1)}{c} \right)}{r1 \left( J_o \frac{(2pi*f*r0)}{c} \right)}$$

wherein:
c = velocity of the Rayleigh waves
f = a discrete frequency
Jo ( ) = a bessel function
pi = ratio of the circumference of a circle to its diameter.

14. The method of claim 13 wherein the plurality of vibrator sources comprises 10 in the outer circle and 10 in the inner circle.

* * * * *